(12) United States Patent
Ideno et al.

(10) Patent No.: US 7,098,258 B2
(45) Date of Patent: Aug. 29, 2006

(54) HEAT-CURABLE RESIN COMPOSITION AND USE THEREOF

(75) Inventors: Ryuji Ideno, Kanagawa (JP); Takeshi Koyama, Kanagawa (JP); Masami Okuo, Aichi (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/879,353

(22) Filed: Jun. 30, 2004

(65) Prior Publication Data

US 2004/0266980 A1    Dec. 30, 2004

(30) Foreign Application Priority Data

Jun. 30, 2003    (JP) .............................. 2003-188477

(51) Int. Cl.
*C08F 24/00* (2006.01)
*C08F 22/00* (2006.01)
*C08F 22/02* (2006.01)
*C08F 22/04* (2006.01)
*G03C 1/73* (2006.01)

(52) U.S. Cl. ...................... 522/170; 522/168; 522/169; 526/266; 526/270; 526/271; 528/403; 528/417; 528/423

(58) Field of Classification Search ................ 522/168, 522/170, 169; 526/266, 270, 271, 273; 528/403, 528/417, 423

See application file for complete search history.

(56) References Cited

U.S. PATENT DOCUMENTS

| | | | |
|---|---|---|---|
| 3,875,122 A * | 4/1975 | Mirolli | ........................ 525/408 |
| 5,116,892 A | 5/1992 | Barbee et al. | |
| 5,145,987 A | 9/1992 | Molzahn | |
| 5,786,430 A | 7/1998 | Kaplan et al. | |
| 2005/0070687 A1* | 3/2005 | Ideno et al. | ................. 528/403 |

OTHER PUBLICATIONS

Communication, with European Search Report, dated Sep. 15, 2004, for No. EP 04 01 4662.

* cited by examiner

Primary Examiner—James J. Seidleck
Assistant Examiner—Sanza L. McClendon
(74) Attorney, Agent, or Firm—Antonelli, Terry, Stout and Kraus, LLP.

(57) ABSTRACT

The heat-curable resin composition of the present invention comprises an epoxy-containing resin and a curing agent, wherein the curing agent is cyclohexanetricarboxylic acid and/or an anhydride thereof. The heat-curable resin composition exhibits an excellent curability without using an curing accelerator and provides a colorless transparent cured product which is little discolored under high-temperature conditions and irradiation conditions of high-energy light. The heat-curable resin composition is suitable for producing coating compositions, adhesives, shaped articles, protective films for color filters and sealing materials for photosemiconductors such as blue LED and white LED.

8 Claims, No Drawings

HEAT-CURABLE RESIN COMPOSITION AND USE THEREOF

BACKGROUND OF THE INVENTION

1. Field of the Invention

The present invention relates to a heat-curable resin composition and its use. The heat-curable resin composition is suitably applied to coating compositions, adhesives, shaped articles, sealing resins for photosemiconductors, or coating liquids for forming protective films of color filters of liquid crystal displays (LCD), solid-state image sensors such as charge coupled device (CCD), or electroluminescent (EL) devices, etc.

2. Description of the Prior Art

Automobile coatings, architectural coatings, and adhesives and shaped articles used in these industrial applications are required to be highly durable and have been produced from heat-curable resins capable of forming a rigid three-dimensional crosslinking structure by heating.

In recent years, color liquid crystal displays (LCD) are rapidly spread as flat panel displays for personal computers, etc. For such color LCD, color filters are essential parts for realizing full color display. In general, the color filter is provided with a protective film to cover and protect the color layers of red (R), green (G) and blue (B). The protective film is required to have sufficient hardness and adhesion property as well as excellent transparency and uniform thickness so as not to adversely affect the pixel colors. To prevent the contamination of the contacting liquid crystal, the protective film is further required to have anti-contamination properties such as passivation properties for preventing contaminants from transferring from the colored layer to liquid crystal and have insolubility to liquid crystal for preventing the protective film itself from dissolving into liquid crystal. In addition, the protective film is required to be high or good in various properties such as heat resistance, hardness, resistance to warm pure water, solvent resistance and storage stability. Also, as photosemiconductors for LCD, a high luminance blue LED and white LED have been developed and their applications have been broadened to backlights for display boards, full color displays and cellular phones, etc.

In the production of these coating compositions, adhesives, shape articles, protective films for color filters and sealing materials for photoelectric transducers such as LED, epoxy/acid anhydride curing type heat-curable resins have been used because of their excellent colorless transparency. As the curing agents for such heat-curable resins, there have been used alicyclic acid anhydrides such as methylhexahydrophthalic anhydride, methyltetrahydrophthalic anhydride, hexahydrophthalic anhydride and tetrahydrophthalic anhydride.

However, since the above compounds show only a low curing reactivity, a curing accelerator must be additionally used to fully cure the heat-curable resins.

As such curing accelerators, for example, triphenylphosphonium bromide (JP 2000-344868A), 2-ethyl-4-methylimidazole (JP 2001-114868A), ethylhexane salt of 1,8-diazabicyclo[5.4.0]undecene-7 (JP 2002-97251A), and tetraphenylphosphonium bromide (JP 2003-26763A) have been used.

To apply the heat-curable resin compositions to coating liquids for forming protective films of color filters or semiconductors such as blue LED and white LED, the heat-curable resin compositions must retain a good colorless transparency for a long period of time. In LCD application fields, COG (chip on glass) liquid crystal devices, etc. come to be widely used in overhead projector applications. In photosemiconductor applications, there has been made a rapid advancement in increasing the luminance of LED. Therefore, the protective films of color filters and the sealing resins come to be exposed to higher temperatures and lights of higher energy to cause discoloration (yellowing), making it difficult to maintain the colorless transparency for a long period of time. One of the causes of the discoloration (yellowing) is the change in phenyl group of the acid anhydride-based curing agent (e.g., trimellitic anhydride) contained in the heat-curable resin compositions (for example, as described in JP 2001-158816A). Therefore, the use of curing agents containing an aromatic group in their molecular structure is undesirable. In addition, the phenyl group or nitrogen component in the curing accelerators may cause the discoloration (yellowing) of the heat-curable resin compositions. Therefore, the use of the curing accelerator in coating liquids for forming protective films of color filters or sealing resins for semiconductors is also undesirable in view of maintaining a good colorless transparency of the heat-curable resin compositions.

SUMMARY OF THE INVENTION

An object of the present invention is to provide a heat-curable resin composition suitable for coating compositions, adhesives, shaped articles, protective films of color filters, sealing materials for photoelectric transducers such as blue LED and white LED, etc., which exhibits an excellent curability without using a curing accelerator and provides a colorless transparent cured product which is little discolored even under high-temperature conditions and irradiation conditions of high energy light.

Another object of the present invention is to provide a coating liquid capable of forming protective films of color filters used in liquid crystal displays (LCD), solid-state image sensors such as charge coupled devices (CCD), electroluminescence (EL) devices, etc., which exhibits an excellent curability and provides a colorless transparent protective film which is little discolored even under high-temperature conditions and irradiation conditions of high-energy light and is excellent in various properties such as passivation properties, flatness and storage stability.

A still another object of the present invention is to provide a resin cured product produced by curing the above heat-curable resin composition.

A still another object of the present invention is to provide a sealing material for photosemiconductors such as blue LED and white LED, which exhibits an excellent curability and provides a colorless transparent protective sealing which is little discolored even under high-temperature conditions and irradiation conditions of high energy light and is excellent in various properties such as passivation properties, flatness and storage stability.

As a result of extensive researches in view of the above objects, the inventors have found that a heat-curable resin composition containing cyclohexanetricarboxylic acid and/or its anhydride as a curing agent exhibits a good curability without using a curing accelerator and provides a colorless transparent cured product. The inventors have further found that such a heat-curable resin composition is suitable for producing coating compositions, adhesives, shaped articles, coating liquids for forming protective films of color filters and sealing materials for photosemiconductors such as blue LED and white LED. The present invention has been accomplished on the basis of these findings.

Thus, the present invention provides a heat-curable resin composition comprising an epoxy-containing resin and a curing agent wherein the curing agent is cyclohexanetricarboxylic acid and/or its anhydride; a resin cured product produced by curing the heat-curable resin composition; a coating liquid for forming protective films of color filters which comprises the heat-curable resin composition; and a sealing material for photosemiconductors which comprises the heat-curable resin composition.

DETAILED DESCRIPTION OF THE INVENTION

The present invention will be described below in detail.

The curing agent used in the heat-curable resin composition of the present invention is a cyclohexanetricarboxylic acid and/or a cyclohexanetricarboxylic anhydride.

Examples of the cyclohexanetricarboxylic acids include cyclohexane-1,2,4-tricarboxylic acid, cyclohexane-1,3,5-tricarboxylic acid and cyclohexane-1,2,3-tricarboxylic acid. Examples of the cyclohexanetricarboxylic anhydrides include cyclohexane-1,3,4-tricarboxylic 3,4-anhydride, cyclohexane-1,3,5-tricarboxylic 3,5-anhydride and cyclohexane-1,2,3-tricarboxylic 2,3-anhydride. Of these compounds, preferred are cyclohexane-1,2,4-tricarboxylic acid, cyclohexane-1,3,5-tricarboxylic acid and cyclohexane-1,3,4-tricarboxylic 3,4-anhydride. These compounds may be used singly or in combination of two or more. These compounds may be produced, for example, by hydrogenation of benzenetricarboxylic acids such as trimellitic acid.

The heat-curable resin composition of the present invention may further contain, in addition to the cyclohexanetricarboxylic acid and/or the cyclohexanetricarboxylic anhydride, an alicyclic acid anhydride such as methylhexahydrophthalic anhydride, methyltetrahydrophthalic anhydride, hexahydrophthalic anhydride and tetrahydrophthalic anhydride unless the curability of the heat-curable resin composition and the transparency of the resultant cured product are adversely affected.

As the epoxy-containing resin used in the heat-curable resin composition of the present invention, there may be used epoxy resins and epoxy-containing polymers singly or in combination of two or more.

Examples of the epoxy-resins include bisphenol A epoxy resins, bisphenol F epoxy resins, cresol novolak epoxy resins, phenol novolak epoxy resins, biphenyl epoxy resins, stilbene epoxy resins, hydroquinone epoxy resins, naphthalene skeleton epoxy resins, tetraphenylolethane epoxy resins, DPP (di-n-pentylphthalate) epoxy resins, tris(hydroxyphenyl)methane epoxy resins, dicyclopentadiene phenol epoxy resins, alicyclic epoxy resins such as 3,4-epoxycyclohexylmethyl-3',4'-epoxycyclohexanecarboxylate and vinylcyclohexenediepoxide, diglycidyl ethers of bisphenol A-ethyleneoxide adducts, diglycidyl ethers of bisphenol A-propyleneoxide adducts, cyclohexanedimethanol diglycidyl ethers, polyglycidyl ethers of aliphatic polyhydric alcohols, polyglycidyl esters of polybasic acids such as diglycidyl esters of hexahydrophthalic anhydride, alkyl glycidyl ethers such as butyl glycidyl ether and lauryl glycidyl ether, and glycidyl ethers having one epoxy group such as phenyl glycidyl ether and cresyl glycidyl ether. The hydrogenated products of the above epoxy resins on their nucleus are also usable.

These compounds may be used singly or in combination of two or more. In particular, the use of the alicyclic epoxy resins and/or the epoxy resins having their aromatic nucleus hydrogenated is preferable because the colorless transparency of cured products of the heat-curable resin compositions are more improved.

The epoxy-containing polymers are those having at least one constituting unit A represented by the following formula 1 and at least two constituting unit B represented by the following formula 2.

The constituting unit A is represented by

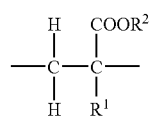

(1)

wherein $R^1$ is hydrogen or $C_1$ to $C_{12}$ alkyl, $R^2$ is hydrogen or $C_1$ to $C_{12}$ alkyl, or $R^2$ is alicyclic hydrocarbon group, aryl, aryloxy, aromatic hydrocarbon group or aromatic polyalkylene glycol residue each having a $C_3$ to $C_{12}$ main ring structure.

The constituting unit B is represented by

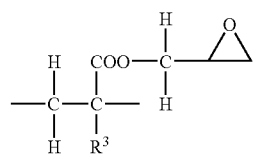

(2)

wherein $R^3$ is hydrogen or $C_1$ to $C_{10}$ alkyl.

The constituting unit A of the formula 1 is derived from a monomer represented by the following formula 3:

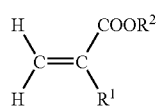

(3)

wherein $R^1$ is hydrogen or $C_1$ to $C_{12}$ alkyl, $R^2$ is hydrogen or $C_1$ to $C_{12}$ alkyl, or $R^2$ is alicyclic hydrocarbon group, aryl, aryloxy, aromatic hydrocarbon group or aromatic polyalkylene glycol residue each having a $C_3$ to $C_{12}$ main ring structure.

The constituting unit represented by the formula 2 is derived from a monomer represented by the following formula 4:

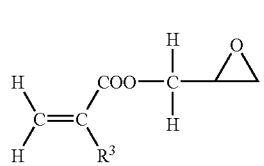

(4)

wherein $R^3$ is hydrogen or $C_1$ to $C_{10}$ alkyl.

The use of the monomer represented by the formula 3 allows the resultant protective film to have a sufficient hardness and transparency. The $C_3$ to $C_{12}$ main ring structure of the alicyclic hydrocarbon group represented by $R^2$ in the formula 3 may have an additional structure, for example, intracyclic double bond, side hydrocarbon group, side spiro ring and endhydrocarbylene bridge. In the formula 3, $R^1$ is preferably hydrogen or methyl, and $R^2$ is preferably unsubstituted or $C_1$ to $C_5$ alkyl-substituted cyclohexyl.

Examples of the monomer represented by the formula 3 include methyl (meth)acrylate, ethyl (meth)acrylate, cyclohexyl (meth)acrylate, methoxylated cyclodecatriene acrylate, p-tert-butylcyclohexyl (meth)acrylate, isobornyl (meth) acrylate, benzyl (meth)acrylate, dicyclopentenyl (meth) acrylate, tetrahydrofurfuryl (meth)acrylate, phenoxyethyl (meth)acrylate, phenoxydiethylene glycol (meth)acrylate, phenoxytetraethylene glycol (meth)acrylate, phenoxyhexaethylene glycol (meth)acrylate and phenyl (meth)acrylate. The term, (meth)acrylate, used herein means either acrylate or methacrylate.

The monomer represented by the formula 4 is used to introduce the epoxy group (reaction site of epoxy) into the polymers. In the formula 4, $R^3$ is preferably hydrogen or methyl. Examples of the monomers represented by the formula 4 include glycidyl (meth)acrylate and 3,4-epoxycyclohexylmethyl (meth)acrylate, with glycidyl (meth)acrylate (GMA) being preferred in view of easy availability.

The epoxy-containing polymer may be a random copolymer or a block copolymer. In addition, the main polymer chain of the epoxy-containing polymer may further contain another kind of constituting unit other than those represented by the formula 1 or 2. The ratio of the constituting unit of the formula 1 to the constituting unit of the formula 2 in the epoxy-containing polymer is preferably 10:90 to 90:10 in terms of the weight charge ratio of the monomer of the formula 3 and the monomer of the formula 4. When the amount of the constituting unit of the formula 1 falls within the above range, the number of reaction sites for curing reaction is sufficient to result in a high crosslinking density. When the amount of the constituting unit of the formula 2 falls within the above range, the cure shrinkage due to the deficiency of bulky skeleton is prevented. The weight-average molecular weight of the epoxy-containing polymer is preferably 3,000 to 100,000 when calibrated by polystyrene standard. Within the above molecular weight range, the coating film of the heat-curable resin composition is prevented from growing tacky and easily made uniform in its thickness.

The epoxy-containing polymer is produced, for example, by the following method.

In a four-necked flask equipped with a thermometer, a reflux condenser, a stirring device and a dropping funnel, a solvent is heated to 80° C. under stirring. Then, a mixture (dropping component) of a polymerization initiator and a composition containing the monomer of the formula 3, the monomer of the formula 4 and optionally another monomer and is added dropwise at a fixed rate to the solvent from the dropping funnel over 2 h. After completion of the dropwise addition, the temperature is kept at 80° C. for 5 h to obtain the epoxy-containing polymer.

The blending ratio of the epoxy-containing resin and the curing agent is not particularly limited as long as the aimed effects of the present invention are attained, and preferably 0.1 to 3.0, more preferably 0.3 to 1.5 in terms of an equivalent ratio represented by the following formula:

Equivalent ratio=$(X/2)/Y$ wherein X is a total carboxyl corresponding number in both the curing agent and the resin when assuming one acid anhydride group as a carboxyl corresponding number of 2 and one carboxylic acid group as a carboxyl corresponding number of 1 and Y is a number of epoxy groups in the resin.

When the equivalent ratio is 0.1 or higher, the curing reaction proceeds sufficiently. When the equivalent ratio is 3.0 or lower, the cured product is preferably prevented from the lowering in the glass transition temperature (Tg), the deterioration in the moisture absorption and colorless transparency, and the discoloration under high-temperature conditions and under irradiation conditions of high-energy light. The total carboxyl corresponding number is determined by neutralization titration, etc., and the number of epoxy groups in the resin is calculated from the epoxy equivalent.

The heat-curable resin composition of the present invention exhibits a good curability without using any curing accelerator. However, if appropriate, the heat-curable resin composition may contain the curing accelerator unless the colorless transparency of the resultant cured product is adversely affected. Examples of the curing accelerator usable in the present invention include tertiary amines such as benzyldimethylamine, tris(dimethylaminomethyl)phenol and dimethylcyclohexylamine; imidazoles such as 1-cyanoethyl-2-ethyl-4-methylimidazole, 2-ethyl-4-methylimidazole and 1-benzyl-2-methylimidazole; organophosphorus compounds such as triphenylphosphine and triphenyl phosphite; quaternary phosphonium salts such as tetraphenylphosphonium bromide and tetra-n-butylphosphonium bromide; diazabicycloalkenes such as 1,8-diazabicyclo [5.4.0]undecene-7 and organic acid salts thereof; organometallic compounds such as zinc octanoate, tin octanoate and aluminum-acetylacetone complex; quaternary ammonium salts such as tetraethylammonium bromide and tetrabutylammonium bromide; boron compounds such as boron trifluoride and triphenyl borate; and metal halides such as zinc chloride and stannic chloride. Also usable are latent curing accelerators. Examples thereof include high-boiling dispersion latent curing accelerators such as amine-modified accelerators comprising adducts of epoxy resins with high-boiling imidazole compounds, dicyandiamide or amines; microencapsulated latent curing accelerators prepared by coating the surface of imidazole-, phosphorus- or phosphine-based accelerators with polymers; and high-temperature dissociating, thermally cation-polymerizable latent curing accelerators such as amine salt latent curing accelerators, Lewis acid salts and Brønsted acid salts. These curing accelerators may be used singly or in combination of two or more.

The heat-curable resin composition of the present invention may also contain, if required, various additives unless the addition thereof adversely affects the aimed effects of the present invention. Examples of the additives include carbon dioxide gas inhibitors such as aliphatic polyols including ethylene glycol and propylene glycol, aliphatic or aromatic carboxylic acids and phenol compound; flexibilizers such as polyalkylene glycol; antioxidants; plasticizers; lubricants; silane coupling agents; surface-treating agents such as inorganic fillers; flame retardants; oxidation inhibitors; colorants; leveling agents; ion-trapping agents; slide modifiers; various rubbers; impact modifiers such as organic polymer beads and inorganic fillers including glass beads and glass fibers; thixotropic agents; surfactants; surface tension modifiers; defoamers; anti-setting agents; light-diffusing agents; ultraviolet absorbers; antioxidants; releasing agents; fluorescent agents; and conductive fillers.

The method for the reaction between the epoxy-containing resin and the curing agent (curing method) is not particularly limited, and any of curing apparatuses such as closed curing oven and tunnel kiln capable of continuous curing operation may be employed. The heat source is not particularly limited, and the heating may be conducted by hot-air circulation, infrared heating, induction heating, etc. The curing temperature and time are preferably 80 to 250° C. and 30 s to 10 h. To reduce the internal stress of the cured product, the heat-curable resin composition is preferably pre-cured at 80 to 120° C. for 0.5 to 5 h, and then post-cured at 120 to 180° C. for 0.1 to 5 h. For short-time curing, it is preferred to cure at 150 to 250° C. for 30 s to 30 min.

The heat-curable resin composition of the present invention is suitably applied to coating liquids for forming protective films of color filters used in liquid crystal displays, CCD, EL displays, etc. and sealing materials for blue LED, white LED, CCD, etc., because its cured product is colorless and transparent and is less discolored even under long-term high-temperature conditions and irradiation conditions of high-energy light.

In the present invention, the term, "sealing materials for photosemiconductors," means sealing materials used for photosemiconductor devices such as LED, photoreceptors, phototransistors, photodiodes and CCD.

The heat-curable resin composition of the present invention is prepared by melt-mixing or solution-mixing the essential components (the epoxy-containing resin and the curing agent) and the optional components (additives, etc.). The components may be mixed in any order. The mixing is preferably conducted at room temperature to 200° C. for 30 sec to 5 min. In the solution mixing, all the components may be dissolved in a single solvent at the same time and mixed to prepare the heat-curable resin composition. Alternatively, after respectively dissolving the components in separate solvents of the same kind or different kinds to prepare two or more solutions, these solutions may be mixed with each other to prepare the heat-curable resin composition. The mixing procedure may be performed by stirring the components using a motor equipped with agitation blades or a magnetic stirrer, or by introducing the components into a gallon container and rotating the gallon container using a mixing rotor. The heat-curable resin composition thus produced may be used as the coating liquid for forming protective films or the sealing material as-produced.

Next, the application of the heat-curable resin composition of the present invention to the coating liquid for forming protective films of color filters is described.

Generally, the color filter has a transparent glass substrate, a black matrix of given patterns formed on the substrate, red (R), green (G) and blue (B) colored layers of given patterns formed on the substrate, and a protective film covering the colored layers. On the protective film, a transparent electrode for driving liquid crystals may be provided, if required. Further, pillar spacers may be provided on the transparent electrode, colored layers or protective film so as to superimpose over the region of the black matrix.

The heat-curable resin composition of the present invention is applied onto the surface of the colored layers of a color filter by a method such as spin-coating, roll-coating, spray-coating and printing, and the resultant coating film is dried, optionally pre-baked, and then heated to form a protective film.

In the spin-coating method, the rotation speed is preferably 500 to 1500 rpm. In general, the thickness of the protective film (after completion of curing) is about 0.5 to 3.0 μm.

As described above, the heat-curable resin composition of the present invention may be used as the sealing material for photoelectric transducers such as blue LED and white LED. The sealing material is prepared, for example, by the following method.

After mixing the essential components and the optional component, the mixture is further kneaded at room temperature to 200° C. in a kneader such as a universal stirring vessel. Then, the obtained mixture is cooled to room temperature (about 25° C.) to produce the aimed sealing material for photoelectric transducers. The fluidity of the sealing material for photoelectric transducers may be controlled by an organic solvent such as toluene, xylene, methyl ethyl ketone (MEK), acetone and diacetone alcohol. These solvents may be used singly or in combination of two or more.

Taking the sealing of LED as an example, the application of the heat-curable resin composition of the present invention to the sealing material for photoelectric transducers is described. The heat-curable resin composition of the present invention is applied onto LED having, for example, a cylindrical shape by a method such as roll-coating, spray-coating and dip-coating, and then dried. The coating film thus formed is optionally pre-baked, and then heated to form a sealing layer.

In addition to the applications or uses described above, the heat-curable resin composition of the present invention is further applicable to the uses requiring a good transparency, for example, applicable to insulating sealing materials for photoelectric transducers such as other LED, light emitting devices such as semiconductor lasers, photoconductive devices, photoreceptors such as photodiodes, solar cells, phototransistors and photothyristers, and optocouplers such as photocouplers and photointerrupters; adhesives for liquid crystals; photosensitive resins; surface coating agents for plastics, glass and metals; and decorative materials.

Further, the heat-curable resin composition of the present invention is further applicable to the formation of insulating seals and the production of shaped articles of 2 mm thick or more by a method such as potting, casting filament-winding and lamination. Specifically, applicable to the insulating seals for heavy electric apparatuses such as mold transformers including current transformers (CT), zero layer current transformers (ZCT), potential transformers (PT) and grounding potential transformers (GPT); parts of gas switches including insulating spacers, supporting insulators, operating rods, closed terminals, bushings, insulating pillars, etc.; parts of solid-state insulator switches; parts of automatic overhead wiring apparatuses including rotary insulators, voltage detector elements, general capacitors, etc.; parts of underground wiring apparatuses including mold disconnecting switches, power transformers, etc.; static condensers; resin insulators; and linear motor car coils, and also applicable to impregnating varnishes for coils of various rotating apparatuses such as generators and motors.

In addition, the heat-curable resin composition of the present invention may also be used in weak electric applications such as potting resins for flyback transformers, ignition coils or AC capacitors; transparent sealing resins for LED, detectors, emitters or photocouplers; and impregnating resins for film capacitors and various coils. Other applications of the heat-curable resin composition of the present invention include laminate applications and applications not necessarily required to be insulating such as various FRP shaped articles, various coating materials, adhesives and decorative materials.

The present invention will be described in more detail with reference to the following examples. However, it should be noted that the following examples are only illustrative and not intended to limit the invention thereto. The "part" used herein means "part by weight", unless otherwise specified.

REFERENCE EXAMPLE 1

Production of Epoxy-Containing Polymer

In a four-necked flask equipped with a thermometer, a reflux condenser, a stirring device and a dropping funnel, 40.0 parts of propylene glycol monomethyl ether acetate was heated to 80° C. under stirring. Then, a uniform mixture (dropping component) prepared in advance by mixing 28.4 parts of glycidyl methacrylate, 21.6 parts of methyl methacrylate, 4.0 parts of a peroxide-based polymerization initiator "Perbutyl O" available from NOF Corporation, and 6.0 parts of propylene glycol monomethyl ether acetate was added dropwise into the flask at 80° C. over 2 h at a constant rate. After completion of the addition, the temperature was maintained at 80° C. for 5 h to complete the reaction. The resultant polymer solution was dried under vacuum to distil off the propylene glycol monomethyl ether acetate solvent, thereby obtaining an epoxy-containing polymer (a) having a weight-average molecular weight (Mw) of 15000 and an epoxy equivalent of 250. The weight-average molecular weight (Mw) was measured by GPC, and the epoxy equivalent was measured according to JIS K7236-1986.

EXAMPLE 1

A heat-curable resin composition was prepared by uniformly mixing 25.6 parts of cyclohexane-1,3,4-tricarboxylic 3,4-anhydride and 41.0 parts of an aromatic nucleus-hydrogenated product of bisphenol A epoxy resin (tradename: "Epicoat YX8000" available from Japan Epoxy Resin Co., Ltd.; epoxy equivalent: 205). The obtained heat-curable resin composition was evaluated for the curability by measuring the torque rise initiation time at 170° C. using a labo plastomill "LABO PLASTOMILL 30C150" available from Toyo Seiki Seisakusho Co., Ltd. The result is shown in Table 1.

EXAMPLE 2

A heat-curable resin composition was prepared in the same manner as in Example 1 except for using 26.0 parts of cyclohexane-1,2,4-tricarboxylic acid instead of 25.6 parts of cyclohexane-1,3,4-tricarboxylic 3,4-anhydride, and evaluated for the curability. The result is shown in Table 1.

EXAMPLE 3

A heat-curable resin composition was prepared in the same manner as in Example 1 except for using 50.0 parts of the epoxy-containing polymer (a) (epoxy equivalent: 250) prepared in Reference Example 1 instead of 41.0 parts of the aromatic nucleus-hydrogenated product of bisphenol A epoxy resin (tradename: "Epicoat YX8000" available from Japan Epoxy Resin Co., Ltd.), and evaluated for the curability. The result is shown in Table 1.

EXAMPLE 4

A heat-curable resin composition was prepared in the same manner as in Example 1 except for using 26.0 parts of cyclohexane-1,2,4-tricarboxylic acid instead of 25.6 parts of cyclohexane-1,3,4-tricarboxylic 3,4-anhydride, changing the amount of the aromatic nucleus-hydrogenated product of bisphenol A epoxy resin (tradename: "Epicoat YX8000" available from Japan Epoxy Resin Co., Ltd.) from 41.0 parts to 10.3 parts, and using 37.9 parts of the epoxy-containing polymer (a) (epoxy equivalent: 250) prepared in Reference Example 1, and evaluated for the curability. The result is shown in Table 1.

COMPARATIVE EXAMPLE 1

A heat-curable resin composition was prepared in the same manner as in Example 1 except for using 33.8 parts of methylhexahydrophthalic anhydride (tradename: "Rikacid MH700" available from New Japan Chemical Co., Ltd.) instead of 25.6 parts of cyclohexane-1,3,4-tricarboxylic 3,4-anhydride, and evaluated for the curability. The result is shown in Table 1.

COMPARATIVE EXAMPLE 2

A heat-curable resin composition was prepared in the same manner as in Example 1 except for using 33.8 parts of methylhexahydrophthalic anhydride (tradename: "Rikacid MH700" available from New Japan Chemical Co., Ltd.) instead of 25.6 parts of cyclohexane-1,3,4-tricarboxylic 3,4-anhydride and using 50.0 parts of the epoxy-containing polymer (a) (epoxy equivalent: 250) prepared in Reference Example 1 instead of 41.0 parts of the aromatic nucleus-hydrogenated product of bisphenol A epoxy resin (tradename: "Epicoat YX8000" available from Japan Epoxy Resin Co., Ltd.), and evaluated for the curability. The result is shown in Table 1.

TABLE 1

| | Examples | | | | Comparative Examples | |
|---|---|---|---|---|---|---|
| | 1 | 2 | 3 | 4 | 1 | 2 |
| Torque rise initiation time (min) | 11.0 | 5.6 | 3.0 | 4.1 | ≧120 | ≧120 |

EXAMPLE 5

Cyclohexane-1,3,4-tricarboxylic 3,4-anhydride (128 parts) was melted and mixed with 205.0 parts of an aromatic nucleus-hydrogenated product of bisphenol A epoxy resin (epoxy equivalent: 205) to prepare a heat-curable resin composition. The thus obtained heat-curable resin composition was cured at 100° C. for 2 h and then at 150° C. for 3 h to obtain a cured product of 1 mm thick. The cured product was heat-treated in air at 150° C. for 24 h and measured for the 400 nm-light transmittance before and after the heat treatment using a spectrophotometer "UV-3100" available from Shimadzu Corporation. The same cured product was subjected to high-energy light treatment by the irradiation with light from a 200 W high-pressure mercury lamp as a light source in air at 60° C. for 30000 h, and then measured for the 400 nm light transmittance before and after the high-energy light treatment. From the measured values, a light transmittance retention rates before and after each of the heat treatment and the high-energy light treatment was calculated. The results are shown in Tables 2 and 3.

EXAMPLE 6

The same procedure as in Example 5 was repeated except for using 130.0 parts of cyclohexane-1,2,4-tricarboxylic acid instead of 128 parts of cyclohexane-1,3,4-tricarboxylic 3,4-anhydride to produce a heat-curable resin composition, which was then formed into a cured product. The cured product was subjected to the heat treatment and the high-energy light treatment in the same manner as in Example 5 and measured for the light transmittance before and after each treatment. The results are shown in Tables 2 and 3.

EXAMPLE 7

The same procedure as in Example 5 was repeated except for using 250.0 parts of the epoxy-containing polymer (a) (epoxy equivalent: 250) prepared in Reference Example 1 instead of 205.0 parts of the aromatic nucleus-hydrogenated product of bisphenol A epoxy resin (tradename: "Epicoat YX8000" available from Japan Epoxy Resin Co., Ltd.) to produce a heat-curable resin composition, which was then formed into a cured product. The cured product was subjected to the heat treatment and the high-energy light treatment in the same manner as in Example 5 and measured for the light transmittance before and after each treatment. The results are shown in Tables 2 and 3.

EXAMPLE 8

The same procedure as in Example 5 was repeated except for using 130.0 parts of cyclohexane-1,2,4-tricarboxylic acid instead of 128 parts of cyclohexane-1,3,4-tricarboxylic 3,4-anhydride, changing the amount of the aromatic nucleus-hydrogenated product of bisphenol A epoxy resin (tradename: "Epicoat YX8000" available from Japan Epoxy Resin Co., Ltd.) to 51.5 parts and using 189.0 parts of the epoxy-containing polymer (a) (epoxy equivalent: 250) prepared in Reference Example 1 to produce a heat-curable resin composition, which was then formed into a cured product. The cured product was subjected to the heat treatment and the high-energy light treatment in the same manner as in Example 5 and measured for the light transmittance before and after each treatment. The results are shown in Tables 2 and 3.

COMPARATIVE EXAMPLE 3

The same procedure as in Example 5 was repeated except for using 168.0 parts of methylhexahydrophthalic anhydride (tradename: "Rikacid MH700" available from New Japan Chemical Co., Ltd.) instead of 128.0 parts of cyclohexane-1,3,4-tricarboxylic 3,4-anhydride and using 3.7 parts of 2-ethyl-4-methylimidazole as a curing accelerator to produce a heat-curable resin composition, which was then formed into a cured product. The cured product was subjected to the heat treatment and the high-energy light treatment in the same manner as in Example 5 and measured for the light transmittance before and after each treatment. The results are shown in Tables 2 and 3.

COMPARATIVE EXAMPLE 4

The same procedure as in Example 5 was repeated except for using 169.0 parts of methylhexahydrophthalic anhydride (tradename: "Rikacid MH700" available from New Japan Chemical Co., Ltd.) instead of 128.0 parts of cyclohexane-1,3,4-tricarboxylic 3,4-anhydride, using 250.0 parts of the epoxy-containing polymer (a) (epoxy equivalent: 250) prepared in Reference Example 1 instead of 205.0 parts of the aromatic nucleus-hydrogenated product of bisphenol A epoxy resin (tradename: "Epicoat YX8000" available from Japan Epoxy Resin Co., Ltd.), and using 3.7 parts of 2-ethyl-4-methylimidazole as a curing accelerator to produce a heat-curable resin composition, which was then formed into a cured product. The cured product was subjected to the heat treatment and the high-energy light treatment in the same manner as in Example 5 and measured for the light transmittance before and after each treatment. The results are shown in Tables 2 and 3.

COMPARATIVE EXAMPLE 5

A heat-curable resin composition was prepared by uniformly mixing 189.0 parts of the epoxy-containing polymer (a) (epoxy equivalent: 250) prepared in Reference Example 1, 51.5 parts of the aromatic nucleus-hydrogenated product of bisphenol A epoxy resin (tradename: "Epicoat YX8000" available from Japan Epoxy Resin Co., Ltd.) and 210.0 parts of trimellitic anhydride. The heat-curable resin composition was formed into a cured product in the same manner as in Example 5. The cured product was subjected to the heat treatment and the high-energy light treatment in the same manner as in Example 5 and measured for the light transmittance before and after each treatment. The results are shown in Tables 2 and 3.

TABLE 2

|  | Examples | | | | Comparative Examples | | |
| --- | --- | --- | --- | --- | --- | --- | --- |
|  | 5 | 6 | 7 | 8 | 3 | 4 | 5 |
| Before 24 h/150° C. treatment in air (%) | 80.1 | 85.0 | 99.5 | 99.1 | 59.2 | 75.7 | 88.2 |
| After 24 h/150° C. treatment in air (%) | 75.6 | 75.6 | 99.2 | 98.5 | 19.1 | 32.2 | 53.2 |
| 400 nm light transmittance retention rate (%) | 94.3 | 88.8 | 99.7 | 99.4 | 32.3 | 42.5 | 60.3 |

TABLE 3

|  | Examples | | | | Comparative Examples | | |
| --- | --- | --- | --- | --- | --- | --- | --- |
|  | 5 | 6 | 7 | 8 | 3 | 4 | 5 |
| Before 200 W/30000 h irradiation (%) | 80.1 | 85.0 | 99.5 | 99.1 | 59.2 | 75.7 | 88.2 |
| After 200 W/30000 h irradiation (%) | 73.9 | 78.2 | 99.0 | 98.7 | 10.3 | 18.9 | 32.8 |
| 400 nm light transmittance retention rate (%) | 92.3 | 92.0 | 99.5 | 99.6 | 17.4 | 25.0 | 37.2 |

EXAMPLE 9

A heat-curable resin composition was prepared by uniformly mixing the raw materials in the same manner as in Example 1. Onto a glass substrate having RGB color layers interposed between black matrix partitions, 30 cc of the heat-curable resin composition was dropped and spin-coated at 900 rpm to form a uniform coating film on the substrate. The coated substrate was pre-baked in an oven at 80° C. for 5 min and then cured at 200° C. for 60 min under heating to form a liquid crystal protective film. The flatness of the protective film was good. On the substrate having the protective film, an ITO electrode of about 0.13 μm thick for driving liquid crystals was formed by sputtering at 120° C. under $H_2O/O_2$ flow using a sputtering apparatus. The ITO electrode showed an intended uniform surface resistivity of 20 Ω/sq.

EXAMPLE 10

A heat-curable resin composition was prepared by uniformly mixing the raw materials in the same manner as in Example 1. The heat-curable resin composition was introduced into a sealing container, to which a device comprising an electrode, a LED element and a lead frame was dipped. Then, the heat-curable resin composition was cured under heating at 150° C. for 3 h to produce a photosemiconductor device.

The heat-curable resin composition comprising an epoxy-containing resin and a curing agent for the epoxy-containing resin wherein cyclohexanetricarboxylic acid and/or anhydride thereof is used as the curing agent exhibits a good curability without adding a curing accelerator and is capable of forming a colorless transparent cured product. The heat-curable resin composition is less discolored under a long-term exposure to high-temperature conditions or under irradiation of high-energy light, and therefore, suitably applied to coating liquids for forming protective films for color filters of liquid crystal displays (LCD), solid-state image sensors such as charge coupled devices (CCD) and electroluminescent (EL) devices, sealing materials for semiconductors such as blue LED and white LED, paints, adhesives and shaped articles.

What is claimed is:

1. A heat-curable resin composition comprising an epoxy-containing resin and a curing agent, wherein the curing agent is cyclohexanetricarboxylic acid and/or an anhydride thereof, and wherein a blending ratio of the epoxy-containing resin and the curing agent is 0.1 to 3.0 in terms of an equivalent ratio represented by the following formula:

Equivalent ratio=$(X/2)/Y$ wherein X is a total carboxyl corresponding number in both the curing agent and the resin when assuming one acid anhydride group as a carboxyl corresponding number of 2 and one carboxylic acid group as a carboxyl corresponding number of 1 and Y is a number of epoxy groups in the resin.

2. The heat-curable resin composition according to claim 1, wherein the curing agent is at least one compound selected from the group consisting of cyclohexane-1,2,4-tricarboxylic acid, cyclohexane-1,3,5-tricarboxylic acid, cyclohexane-1,2,3-tricarboxylic acid, cyclohexane-1,3,4-tricarboxylic 3,4-anhydride, cyclohexane-1,3,5-tricarboxylic 3,5-anhydride and cyclohexane-1,2,3-tricarboxylic 2,3-anhydride.

3. The heat-curable resin composition according to claim 1, wherein the curing agent is at least one compound selected from the group consisting of cyclohexane-1,2,4-tricarboxylic acid, cyclohexane-1,3,5-tricarboxylic acid and cyclohexane-1,3,4-tricarboxylic-3,4-anhydride.

4. The heat-curable resin composition according to claim 1, further comprising a solvent.

5. The heat-curable resin composition according to claim 1, which is made into a cured product.

6. The heat-curable resin composition according to claim 1 in a form of a coating liquid for forming protective films for color filters.

7. The heat-curable resin composition according to claim 1 in a form of a sealing material for photosemiconductors.

8. The heat-curable resin composition according to claim 1, wherein said blending ratio is 0.3 to 1.5.

* * * * *